United States Patent [19]

Toyoda et al.

[11] 4,104,666

[45] Aug. 1, 1978

[54] EXPOSURE CONTROL CIRCUIT FOR CAMERA

[75] Inventors: Kenji Toyoda, Kawasaki; Sakuji Watanabe, Yono, both of Japan

[73] Assignee: Nippon Kogaku K.K., Tokyo, Japan

[21] Appl. No.: 739,850

[22] Filed: Nov. 9, 1976

[30] Foreign Application Priority Data

Nov. 14, 1975 [JP] Japan .................................. 50-136311

[51] Int. Cl.² ........................... G03B 9/02; G03B 9/08
[52] U.S. Cl. ..................................... 354/234; 354/271
[58] Field of Search ................... 354/23 R, 24, 43, 48, 354/50, 51, 53, 54, 60 R, 60 E, 60 L, 234, 235, 271; 361/152

[56] References Cited

U.S. PATENT DOCUMENTS

| 3,293,505 | 12/1966 | Miller | 361/152 |
| 3,922,693 | 11/1975 | Matsui | 354/234 X |
| 3,977,011 | 8/1976 | Matsuda | 354/50 X |

*Primary Examiner*—L. T. Hix
*Assistant Examiner*—M. L. Gellner
*Attorney, Agent, or Firm*—Fitzpatrick, Cella, Harper & Scinto

[57] ABSTRACT

The disclosure describes an improved exposure control circuit for camera in which an electromagnet adapted for control of camera shutter or diaphragm is excited with a constant current stabilized against variation of source voltage so that the operation time of said shutter or diaphragm may be remained always constant.

2 Claims, 1 Drawing Figure

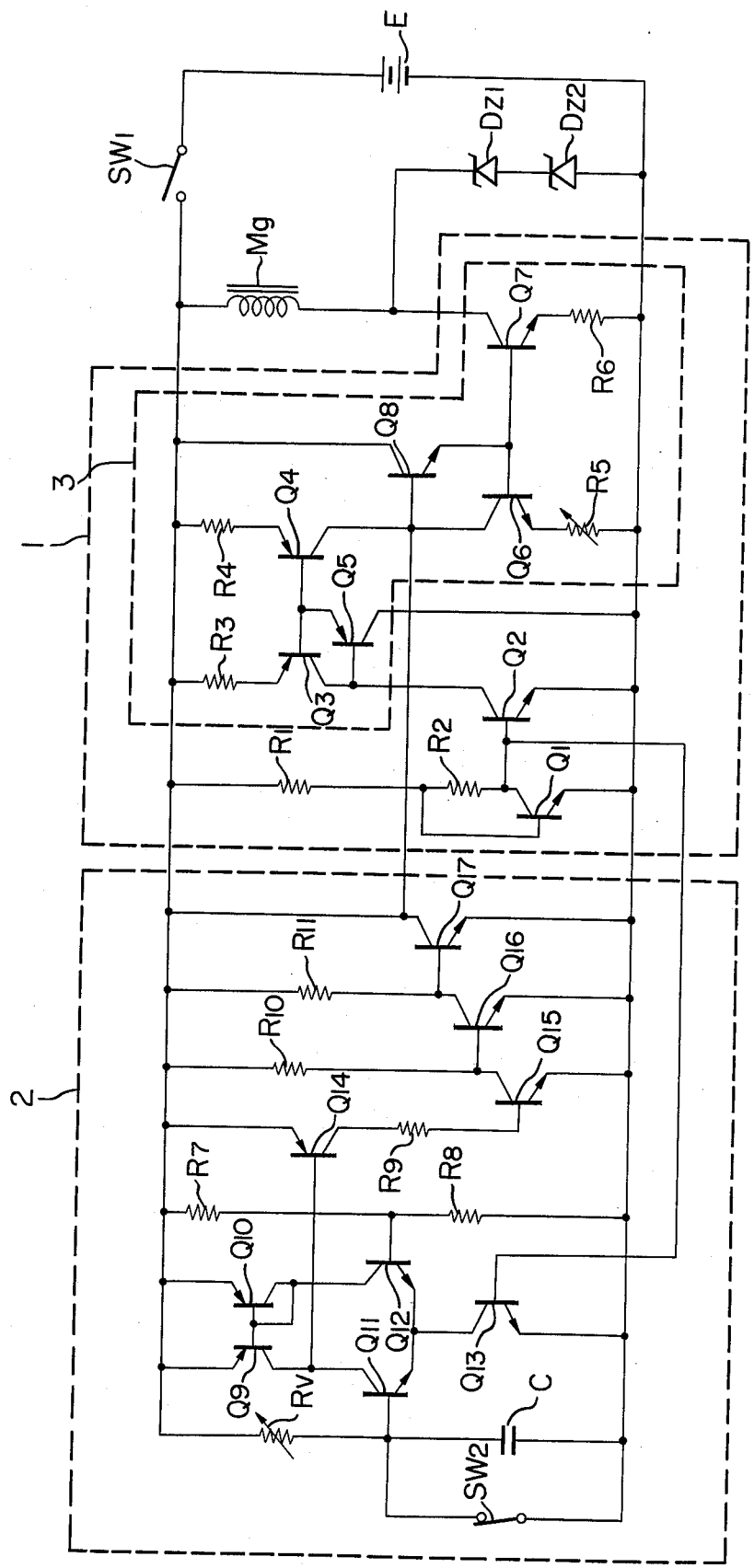

4,104,666

EXPOSURE CONTROL CIRCUIT FOR CAMERA

BACKGROUND OF THE INVENTION

1. Field of the Invention

The present invention relates to an exposure control circuit for a camera and more particularly to an improvement of such control circuit including an electromagnet to control a camera shutter or diaphragm.

2. Description of the Prior Art

In general, the attraction force of an electromagnet is not lost immediately after the current through its winding is shut off, but rather it decays exponentially with time. Further, when the electromagnet is turned off from its excited condition to demagnetization, the decay rate of its attraction force varies in accordance with the value of the current that had flowed through the winding during its excited condition.

The same phenomenon occurs also, but in opposed direction, when the electromagnet is turned on from its demagnetized condition to excitation. The increasing rate of the attraction varies then in accordance with the value of the current flowing into the winding.

Since winding current is proportional to source voltage with which the magnet is excited, we can consider this phenomenon as substituting the variation of source voltage for that of the winding current.

The above described phenomenon is of importance in particular for the control of a camera shutter or diaphragm with an electromagnet. To control the shutter or diaphragm, a power source cell having a very limited capacity is usually used and a stable control is always required. The phenomenon has adverse affects on the electromagnet controlling shutter or diaphragm.

As to the control of the camera shutter, there are known two types of control system. The one is of the type wherein the electromagnet is excited and its attraction force is used to prevent the shutter from closing. After a certain given time has passed, the electromagnet is demagnetized to release the shutter. In the other type of control system, the shutter is actuated to open while the electromagnet is in the demagnetized condition, and after a certain given time has passed, the electromagnet is excited to commence the closing action of the shutter.

In either type of electric shutter, the closing action of the shutter is actuated only when the attraction force of the electromagnet has reached a given level, whatever the shutter speed may be. Therefore, if the source voltage with which the electromagnet is excited, is reduced for any reason, for example, due to use-up or low temperature in a cold region, the variation of the source voltage will cause an error in shutter speed, in particular, on the high speed side. It is the same as to a control circuit in which camera diaphragm is controlled by an electromagnet.

SUMMARY OF THE INVENTION

Accordingly, it is the primary object of the present invention to provide an improved exposure control circuit which enables a camera shutter or diaphragm under the control of an electromagnet always to operate stably and accurately irrespective of variation of source voltage.

Other and further objects, features and advantages of the invention will appear more fully from the following description.

BRIEF DESCRIPTION OF THE DRAWING

The single FIGURE is a wiring diagram of an embodiment of an electric circuit of the present invention.

DESCRIPTION OF THE PREFERRED EMBODIMENT

Description of the preferred embodiment will now be made with reference to the accompanying drawing. The electric circuit illustrated is for the type of electric shutter wherein the shutter speed is manually set. The illustrated circuit comprises a constant current circuit 1, and a shutter speed setting circuit 2. In the circuit 1, transistor $Q_1$ and resistors $R_1$ and $R_2$ as arranged as shown so that the collector potential of the transistor $Q_1$ is stabilized against variation of voltage of source E. This means that the collector current of transistors $Q_2$ and $Q_{13}$ is a constant current.

The collector current (Ic) of the transistor $Q_2$ is amplified by a known Current Mirror circuit 3 composed of transistors $Q_3$ - $Q_8$ and resistors $R_3$ - $R_6$. To the collector of the transistor $Q_7$, there is conducted an amount of current (Im) which is the product of the current (Ic) and a constant determined by the characteristics of the transistors $Q_3$, $Q_4$, $Q_6$ and $Q_7$ and the resistance values of the resistors $R_3$, $R_4$, $R_5$ and $R_6$. Of course, the current (Im) is stabilized against variation of source voltage. To control the closing action of the shutter of a camera (not shown), there is provided an electromagnet Mg. The electromagnet Mg is excited by said stabilized current (Im). The transistors $Q_1$ - $Q_8$ and the resistors $R_1$ - $R_6$ mentioned above constitute the constant current circuit 1 which generates a stable output current irrespective of variation of source voltage.

Zener diodes $D_{Z1}$ and $D_{Z2}$ connected in series are provided to eliminate the back electromotive force of the electromagnet Mg and have the function of protecting the transistor $Q_7$. Switch $SW_1$ is a power source switch and it is closed at the start of shutter release to supply the circuit with power. Resistor Rv is interlocked with a shutter speed set dial of the camera (not shown) and its resistance value varies in accordance with the shutter speed then set. The resistor Rv and a capacitor C constitute a CR integration circuit. Switch $SW_2$ is an integration starting switch that is opened in interlock with the opening action of the camera shutter (not shown). A difference amplifier composed of transistors $Q_9$ - $Q_{13}$ blocks the transistor $Q_7$ in the constant current circuit 1 through the transistors $Q_{14}$ - $Q_{17}$ and transistor $Q_8$ when the charge potential of the capacitor C has reached a certain level determined by the resistors $R_7$ and $R_8$. The above mentioned transistors $Q_9$ - $Q_{17}$, resistor Rv, capacitor C and switch SW2 constitute a shutter speed setting circuit 2.

The operation of the above described apparatus will now be explained.

Upon the start of the shutter release of the camera (not shown), at first the switch $SW_1$ is closed to supply the constant current circuit 1 and the shutter speed setting circuit 2 with power from the source E. Since at that time the transistor $Q_{17}$ remains blocked, the electromagnet Mg is excited by the current (Im), which in turn prevents the shutter from closing. Subsequently, upon the start of the opening action of the shutter, the switch $SW_2$ is opened so that the capacitor C is charged. When the charge voltage of the capacitor C has reached a predetermined level, the transistors $Q_{14}$ and $Q_{15}$ become conductive whereas the transistor $Q_{16}$ is blocked, and the transistor $Q_{17}$ becomes conductive whereas the transistor $Q_7$ is blocked. Accordingly, the electromagnet Mg is demagnetized and the shutter begins closing. Since the current (Im) then flowing through the electromagnet Mg is stabilized against any variation of source voltage, the time lapsed from the block of the transistor $Q_7$ to the commencement of closing action of the shutter remains always constant. Furthermore, if any one of the resistors $R_1 - R_6$, for example, the resistor $R_5$ as shown in the drawing is a variable resistor and ready to adjust, any possible variance of the current (Im) due to the tolerance of the circuit elements will be corrected adequately.

Also, as to another type of electric shutter whose closing action is commenced by the excitation of an electromagnet, it will be evident to those skilled in the art that the same advantageous result as described above will be obtained by exciting the electromagnet with current stabilized against variation of source voltage.

The same may also apply to the case where an electromagnet to control the diaphragm is to be operated. When the electromagnet is excited by such constant current, any variation of source voltage will never cause the operation time of the diaphragm to vary.

While the embodiment is described particularly as to the case where the electromagnet is excited with the constant current circuit, it may be possible to excite the electromagnet by using a constant voltage circuit and thereby the same result will be obtained. This is because such excitation of the magnet by a constant voltage circuit is nothing but to excite the electromagnet with a constant current.

From the foregoing it will be appreciated that according to the present invention the current flowing through the winding of an electromagnet adapted to control of camera shutter or diaphragm remains always constant by exciting the magnet with a stabilized current against any variation of source voltage. Irrespective of the variation of source voltage, the electromagnet is allowed to operate stably. Therefore, this invention provides an electric circuit advantageously suitable for an exposure control circuit to control camera shutter or diaphragm.

While the invention has been particularly shown and described with reference to one preferred embodiment thereof, it will be understood by those skilled in the art the foregoing and other changes in form and details can be made therein without departing from the scope of the invention.

What is claimed is:

1. An exposure control circuit for electrically controlling a camera shutter or diaphragm, comprising:
    (a) an electromagnet for actuating the shutter or diaphragm when its electromotive force has reached a predetermined value;
    (b) a battery the output voltage of which varies depending on variations in its condition of use;
    (c) constant current means which has for its source an output voltage of said battery, the constant current means exciting the electromagnet with constant current independently of the output voltage of said battery, as long as said last mentioned output voltage varies within a range in which the constant current means is actuated normally; and
    (d) a setting circuit for determining whether or not the constant current means is in condition to excite said electromagnet so that the shutter or diaphragm may be controlled.

2. An exposure control circuit according to claim 1, wherein said constant current means include current adjusting means for determining the value of the constant current.

* * * * *